US006861824B1

(12) United States Patent
Liu et al.

(10) Patent No.: US 6,861,824 B1
(45) Date of Patent: Mar. 1, 2005

(54) CHARGER SYSTEM WITH DUAL-LEVEL CURRENT REGULATION AND DUAL-LEVEL THERMAL REGULATION

(75) Inventors: Kwang H. Liu, Sunnyvale, CA (US); Sorin L. Negru, San Jose, CA (US); Fu-Yuan Shih, Taipei (TW)

(73) Assignee: Arquesttechnology, Inc., Santa Clara, CA (US)

( * ) Notice: Subject to any disclaimer, the term of this patent is extended or adjusted under 35 U.S.C. 154(b) by 260 days.

(21) Appl. No.: 10/193,381

(22) Filed: Jul. 10, 2002

(51) Int. Cl.[7] .................................................. H02J 7/06
(52) U.S. Cl. ...................................... 320/164; 320/137
(58) Field of Search ................................ 320/164, 137, 320/160, 161, 162, 163, 140

(56) References Cited

U.S. PATENT DOCUMENTS

| | | |
|---|---|---|
| 5,463,306 A | 10/1995 | Berry et al. |
| 5,698,964 A | 12/1997 | Kates et al. |
| 5,703,470 A | 12/1997 | Baranowski et al. |
| 5,723,970 A | 3/1998 | Bell |
| 6,144,187 A | 11/2000 | Bryson |
| 6,157,173 A | 12/2000 | Baranowski et al. |
| 6,507,172 B2 | 1/2003 | Sherman ..................... 320/134 |

OTHER PUBLICATIONS

Linear Technology, LTC1733, Monolithic Linear Lithium-Ion Battery Charger with Thermal Regulation data sheet, pp. 1–16, no date.

Maxim Integrated Products, Max1811, Maxim USB-Powered Li+ Charger data sheet, pp. 1–8, Jun. 2003.

*Primary Examiner*—Edward H. Tso
(74) *Attorney, Agent, or Firm*—Anthony B. Diepenbrock, III; Dechert LLP

(57) ABSTRACT

A charging system that concurrently charges a main system and a battery for powering the main system when the charging system is connected to an adapter. The charging system includes a current sensing resistor, a first current control circuit for regulating the current in a linear battery charger and a second current control circuit for controlling the maximum adapter current. The charging system further includes a first temperature control circuit for regulating the current in the battery charger and a second temperature control circuit for controlling the maximum power dissipation of the charging system. The charging system further includes a linear regulator for providing power to the main system from the adapter and a main system voltage control circuit and a battery voltage control circuit. The charging system apportions the adapter current between the main system and the battery charger giving priority to the main system.

15 Claims, 6 Drawing Sheets

CHARGER SYSTEM WITH DUAL-LEVEL CURRENT REGULATION AND DUAL-LEVEL THERMAL REGULATION

CROSS-REFERENCE TO RELATED APPLICATIONS

1. Field of the Invention

The present invention generally relates to battery chargers and more particularly to battery chargers that support system operation while charging.

2. Description of the Related Art

FIG. 1 shows a typical battery charger system that supports charging while operating a main system 13. The system can be a portable electronic device such as a cellular phone handset and the charger can be a unit built-in to the portable device. The charging system 10 includes a rechargeable battery 16, a charger 14, a charger controller 15, and a pair of Schottky diodes 12, 17. An external adapter 11 is connected to the positive side of Schottky diode 12 to provide power to the battery 16 via the charger 14 and to the main system 13. When charging system 10 is not connected to the adapter 11, the main system 13 is powered by battery 16 via Schottky diode 17. Schottky diode 12 prevents battery 16 from activating charger 14, which would otherwise drain power from the battery.

When the charging system 10 is connected to an external adapter 11, the charging system supplies power to system 13 through diode 12. The adapter 11 can be an offline AC-DC power supply or a car adapter with a constant DC output voltage. Since the output voltage of the adapter 11 is always higher than the maximum voltage of the battery 16, the Schottky diode 17 is reverse biased, and the battery 16 is prevented from supplying power to main system 13 when adapter 11 is present. Adapter 11 also supplies power to the charger 14, which, in turn, provides a controlled charging power to the battery 16 under the control of charger controller 15. Charger controller 15 sets a proper charging mode for the charger 14, according to the charging status of the battery and a pre-programmed charging algorithm.

The charging system 10, shown in FIG. 1, supports the concurrent operation of the main system 13 and the charging of the battery 16, when the adapter 11 is connected to the charging system 10. Though concurrent operation and charging are supported, the main system 13 and the charger 14 both contend for power from the adapter 11. This contention can cause a serious problem. Specifically, if the combined current for operating the main system 13 and charging the battery 16 exceeds the maximum current that the adapter 11 is capable of supplying, an over-current condition occurs, causing adapter 11 to shutdown by means of an internal protection circuit therein. If the battery is not sufficiently charged, power to the main system 13 would be abruptly lost, thereby shutting the main system 13 down.

Thus, it is highly desirable that the main system and the charger do not exceed the maximum adapter current. This implies that the adapter current must be apportioned between the main system and the charger such that current used by one reduces current used by the other and the sum remains equal to the maximum adapter current.

FIG. 2 illustrates the voltage and current during a typical charging process for a Lithium Ion battery. There are three time intervals of interest, T0–T1, T1–T2, and T2–T3. Over the time interval T0–T1, the battery is pre-conditioned with a small and constant charging current of about 100 milli-amperes (mA). When the battery voltage reaches about 3.0 volts (V), in period T1–T2, the charger supplies a constant fast-charge current of about 0.95 amperes (A). The period T1–T2 is known as a constant-current phase. During this constant-current phase, battery voltage gradually increases. Once the battery voltage reaches about 4.2V, at T2, a constant-voltage phase T2–T3 is entered. After T2, the charger output voltage is maintained at a constant 4.2V and the charging current is gradually decreased, eventually tapering off to below about 100 mA. At T3, the battery has re-gained full capacity and the charging process terminates.

FIG. 3 shows a prior art adaptive power charging system that prioritizes the system current over the charger current with adapter over-current protection. This charging system monitors the output current of external adapter 21 and dynamically apportions current for operating the main system 24 and current for charging the battery 28 by assigning a higher priority to main system 24 current demand over the charger 27 current demand, unlike the system of FIG. 1.

The charging system of FIG. 3 includes a charger 27, an adapter current control circuit, a charger current control circuit, a battery voltage control circuit and a pair of Schottky diodes. The adapter current control circuit includes a current sensing resistor 22, operational amplifier (opamp) 33, opamp 34 and an isolating diode 35. The charger current control circuit includes a current sensing resistor 26, an opamp 25, an opamp 31, and an isolating diode 32. The battery voltage control circuit includes an opamp 37 and an isolating diode 36.

The current sensing resistor 22 is connected between the adapter 21 and the positive side of first Schottky diode 23, whose negative side connects to the main system 24. Opamp 33 is connected differentially across the current sensing resistor 22. Opamp 34 is connected to the output of opamp 33 and to a first preset voltage. The output of opamp 34 is connected to the positive side of isolating diode 35 whose negative side connects to the control input of charger 27.

Current sensing resistor 26 is connected between the positive side of Schottky diode 23 and the input side of charger 27. Opamp 25 is connected differentially across current sensing resistor 26. The output of opamp 25 is connected to the input of opamp 31 whose other input is connected to a second preset voltage. The output of opamp 31 is connected to the positive side of isolating diode 32 whose negative side connects to the control input of charger 27.

Opamp 37 is connected to a third preset voltage and to the battery 28. The output of opamp 37 is connected to the positive side of isolating diode 36 whose negative side connects to the control input of charger 27. The output of charger 27 connects to the battery 28 and the second Schottly diode 30 connects the battery 28 to the input of the main system 24.

The adapter 21 supplies a constant DC output voltage with an internal maximum output current limit as protection against overload conditions in the adapter. The current-sensing resistor 22 monitors the total adapter current that flows into the charging system. This total adapter current is the sum of current supplied to the main system 24 through first Schottky diode 23, and the current supplied to charger 27 through the second current-sensing resistor 26.

The adapter current flows through current sensing resistor 22 is amplified and level shifted by opamp 33. Assuming that the current sensing resistor has a value of $0.1\Omega$ (ohms), opamp 33 amplifies the voltage drop across the current sensing resistor by a certain gain factor, say a factor of 10.

The output of opamp 33 connects to the positive input of opamp 34 and the inverting input of opamp 34 is connected to a preset voltage, for example, 1.5V. The output of opamp 34 is used to control and regulate the charger current via an isolating diode 35. This adapter current control circuit gives main system 24 a higher priority to receive current from adapter 21, because the control circuit maintains the adapter current at 1.5 Amps by controlling the charger 27. If the main system 24 draws 1.0 A from adapter 21 via first Schottky diode 23, then opamp 34 automatically reduces the current to the charger 27 to no more than 0.5 A, maintaining the adapter current at 1.5 A. If the main system 24 reduces its current demand to 0.5 A, then opamp 34 automatically increases the charging current to 1.0 A. Thus, any current that the main system 24 does not demand is diverted to the charger 27 and the total adapter current is maintained at 1.5 A.

It should be noted that the above described operation implies that charger 27 includes a power switch or pass element that reduces its pass-through current when the control terminal of the switch or element is driven high and increases its pass-through current when the control terminal is driven low. A P-MOSFET or PNP power transistor or equivalent device meets this requirement.

The charger current control circuit includes a second current sensing resistor 26 (shown as a fixed resistor) that provides programmable constant-current regulation for charger 27. Opamp 25 amplifies the voltage drop across sensing resistor 26 and the output of opamp 25 connects to the positive input of opamp 31, whose inverting input is connected to a second preset voltage, an external reference voltage 29. This external reference voltage is either programmed to a fixed value or adjusted dynamically by a system's charging control microprocessor. The charger control circuit sets the maximum charging current for charger 27. The value of the current sensing resistor 26, the gain of opamp 25 and the second preset voltage 29 determine the maximum current. For example, if the second preset voltage 29 is set at 1.0V, the current sensing resistor is 0.1 ohms, and the gain of the opamp 25 is 10, the charger 27 is limited to a maximum charging current of 1.0 A. This constant current is applied to the battery 28 during the constant current charging phase.

The battery voltage control circuit includes opamp 37 which provides constant voltage regulation at 4.2V for charger 27. Constant voltage is applied to the battery 28 during the constant voltage phase.

Diodes 32, 35, and 36 combine provide a logic-OR function for the three opamps 31, 34, 37. The opamp that first reaches a current limit or a voltage limit has a higher output voltage to drive the control terminal of battery charger 27, reducing the charging current.

Charger 27 can be a switching converter type or a linear regulator type. As portable electronic devices are getting smaller and adding more features, more and more portable systems are using linear regulator chargers. Linear chargers require no magnetic components such as inductors or transformers and are smaller in size, making integration on a single chip possible. This greatly reduces the number of external components needed to build a charger circuit.

FIG. 4 shows a prior art adaptive power charging device that permits concurrent system operation and battery charging and includes over-temperature protection. This system includes a charger current control circuit, a temperature control circuit, and a battery voltage control circuit, a linear charger and a pair of Schottky diodes.

The charger 42 is a linear regulator that is controllable to provide a constant-current or a constant-voltage output. Linear charger 42 has a control input that controls the amount of current through the charger. The power input to the charger 42 is connected a current sensing resistor 41 and the power output of the charger 42 is connected to the battery 47.

The charger current control circuit includes the current sensing resistor 41, and two opanps 48, 49, and an isolating diode 57. The opamp 48 is connected differentially to the current sensing resistor 41 and the output of opamp 48 is connected to the positive terminal of opamp 49. The negative terminal of opamp 49 is connected to a preset voltage and the output of opamp 49 is connected to the positive side of the isolating diode 57, whose negative side is connected to the control input of the linear charger 42. Sensing resistor 41, opamp 48 and opamp 49 together set a maximum charging current for the charger 42. If sensing resistor 41 is 0.1 ohms, the gain of opamp 48 is set at 10, and the reference voltage on the positive input of opamp 49 is set at 1.0 volts, then the maximum charger current is 1.0 A.

The battery voltage control circuit includes opamp 46 and isolating diode 59. Opamp 46 provides a constant-voltage regulation at 4.2V during a constant-voltage charging phase of the battery. Opamp 46 has a positive terminal connected to the battery 47 and a negative terminal connected to a preset voltage for controlling the maximum voltage on the battery 47.

The temperature control circuit includes a temperature sensor 44, an opamp 45 and an isolating diode 58. The opamp 45 has a positive terminal that connects to the output of temperature sensor 44 and a negative terminal that is connected to a reference voltage indicative of a preset temperature. The temperature control circuit operates to limit the temperature of the charger system to the preset temperature, when the charger system is packaged in a single unit. It is well-known that a single package unit has a limited power dissipation capability. The parameters that characterize this limited dissipation capability are the maximum operating junction temperature $T_{OP}$ of devices contained in the package, the maximum operating ambient temperature $T_A$ allowed for the package, and the thermal resistance $\Theta_{JA}$ of the package. Specifically, the power dissipation PD is $$PD_{PACKAGE} = \frac{T_{OP} - T_A}{\Theta_{JA}}.$$

For example, assuming a charger IC with a thermal resistance $\Theta_{JA}=50°$ C./W, a maximum charger operating junction temperature of 105° C., and maximum operating ambient temperature is 65° C. The maximum allowable power dissipation of the circuitry in the package is 0.8 Watts.

For the linear charger 42, the power dissipation is the product of charging current $I_{CH}$ and the difference between the input voltage to the linear charger 42 and the output voltage (i.e., the battery voltage), $PD_{CHARGER}=I_{CH}(V_{IN}-V_{OUT})$. Clearly, the PD of the linear charger 42 cannot exceed the PD limit for the package. As discussed above, the charger current control circuit limits the $I_{CH}$ current to 1.0 Amp. Therefore, the voltage difference across the linear charger is limited to 0.8 Volts. However, there is no control circuit to guarantee that the battery voltage does not cause a voltage drop greater than 0.8 Volts across the linear charger 42 but the temperature control circuit provides a limit on power dissipation if the voltage drop across the linear charger is too great. For example, if the adapter voltage is 5.0 Volts and the battery voltage is 3.0 Volts at the beginning of the constant-current phase, the voltage drop across the linear charger is 2.0 Volts. This is greater than the 0.8 Volt limit at 1.0 Amps, so the linear charger 42 must be throttled back. If the power dissipation of the package is to be limited to 0.8 Watts, then the linear charger must be limited to 0.4 Amps (0.8/2.0). Thus, as the junction temperature rises towards the preset level (105° C. in this case), opamp 45 output rises in voltage, forcing linear charger 42 to reduce its charging current. In the steady state, the charger system 40 maintains a charging current level that keeps the junction temperature at 105° C. The thermal limit will regulate the charging current to 0.4 A, corresponding to a power dissipation of 0.8 Watts, and therefore, a temperature rise of 40° C. If the actual ambient temperature is lower than 65° C., the charging current may be larger. As a Lithium Ion battery approaches full charge, the voltage of the battery approaches 4.2 Volts and at 65° C. ambient, the thermal limit opamp 45 automatically raises the charging current to 1.0 A, so that total power dissipation is maintained at 0.8 W.

In summary, both prior art circuits of FIG. 3 and FIG. 4 support the concurrent operation of the main system and battery charging. However, the control circuits of FIG. 3 give priority to main system operation over battery charging but do not provide control of the maximum temperature (or power dissipation) of the charging system when the charger circuit is a linear charger. The control circuits of FIG. 4, on the other hand, provide control over the power dissipation of the charging system but do not provide arbitration between the main system current demand and charger current demand. This creates the real possibility that the adapter may shut down because of an over-current condition.

Thus, there is a need for a charger system that supports concurrent operation of the main system and battery charging, gives priority to the main system over the charger, prevents over-current conditions in the adapter and over-temperature conditions for the circuitry if contained in a single package.

BRIEF SUMMARY OF THE INVENTION

The present invention is directed towards the above-stated need. A system in accordance with the present invention is a charger system for providing power to a main system and a battery. The charger system includes a current sensing circuit, a linear charger, a linear regulator, first and second current control circuits, a shutdown circuit, a temperature sensor, first and second temperature control circuits, and first and second voltage control circuits.

The current sensing circuit includes a current sensing resistor for developing a voltage drop proportional to the current passing through the resistor, and an amplifier connected to the resistor for boosting the voltage drop across the resistor.

The linear charger is connected to receive current from an external adapter via the current sensing resistor and to provide, on an output, current to the battery. The linear charger has a first control input that controls the quantity of current provided by the linear charger to the battery.

The linear regulator is connected to receive current from an external adapter via the current sensing resistor and to provide, on an output, current to the main system. The linear regulator has a second control input that controls the quantity of current provided by the linear regulator to the main system.

The shutdown circuit is configured to prevent the operation of the linear regulator and the linear charger upon receipt of a first or second shutdown input.

The first current control circuit is connected to the amplifier output of the current sensing circuit and has an output connected to the first shutdown input and an input for receiving a first preset voltage that determines a signal value on the first shutdown input.

The second current control circuit is connected to the amplifier output of the current sensing circuit and has an output connected to the first control input and an input for connecting to a second preset voltage that determines a signal value on the first control input.

The temperature sensor is configured to sense the operating temperature of at least the linear regulator and the linear charger and to provide an output indicative of the sensed temperature.

The first temperature control circuit has an input connected to receive the temperature sensor output and an input for receiving a voltage indicative of a first preset temperature and an output connected to the first control input to control the current passing through the linear charger. The first temperature control circuit shuts down the linear charger when the sensed temperature exceeds the first preset temperature.

The second temperature control circuit has an input connected to receive the temperature sensor output and an input for receiving a voltage indicative of a second preset temperature and an output connected to the second shutdown input to shut down the linear regulator and linear charger when the sensed temperature equals or exceeds the second preset temperature.

The first voltage control circuit has a first input connected to the output of the linear regulator and second input for connecting to a third preset voltage and an output connected to the control input of the linear regulator to regulate the voltage provided to the main system.

The second voltage control circuit has a first input connected to the output of the linear charger and a second input for connecting to a fourth preset voltage and an output connected to the control input of the linear charger to regulate the voltage provided to the battery.

One advantage of the present invention is that the invention provides a comprehensive charger control system and method for a device that may reside in a single package. The comprehensive control system assures an optimal charging current at all times without violating overall adapter current limits or exceeding maximum allowable operating temperatures.

Another advantage of the present invention is that the present invention enables more power management functions to be integrated into a single device and increases the overall efficiency of the adapter-charger system.

Yet another advantage is that the invention provides a simple yet comprehensive charger control scheme for a basic monolithic linear charger integrated circuit as well as for a linear charger integrated circuit with extended power management functions.

Yet another advantage is that control of the adapter current not only assigns higher priority to the main system current and but also protects against system faults such as a short circuit.

Yet another advantage is that control of the device temperature not only regulates charging current such that the charging system will not exceed its maximum operating temperature but also protects against main system electrical faults or assembly defects that could cause the main system to overheat the charging system.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
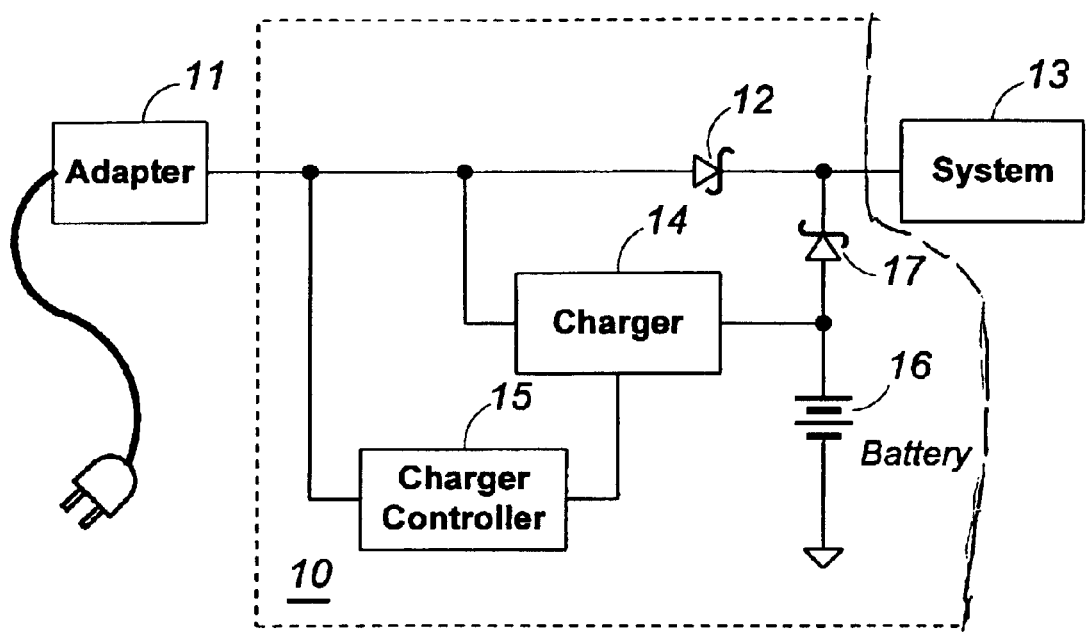
FIG. 1 shows a typical battery charger system that supports charging while operating a system.
Figure 2:
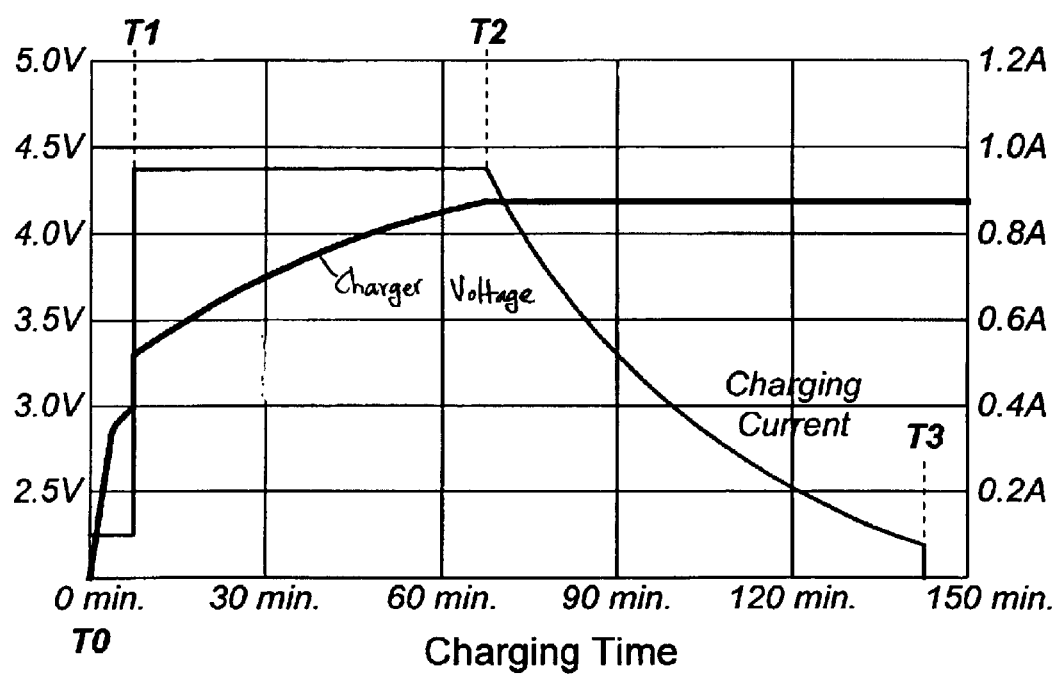
FIG. 2 illustrates the voltage and current during a typical charging process for a Lithium Ion battery.
Figure 3:
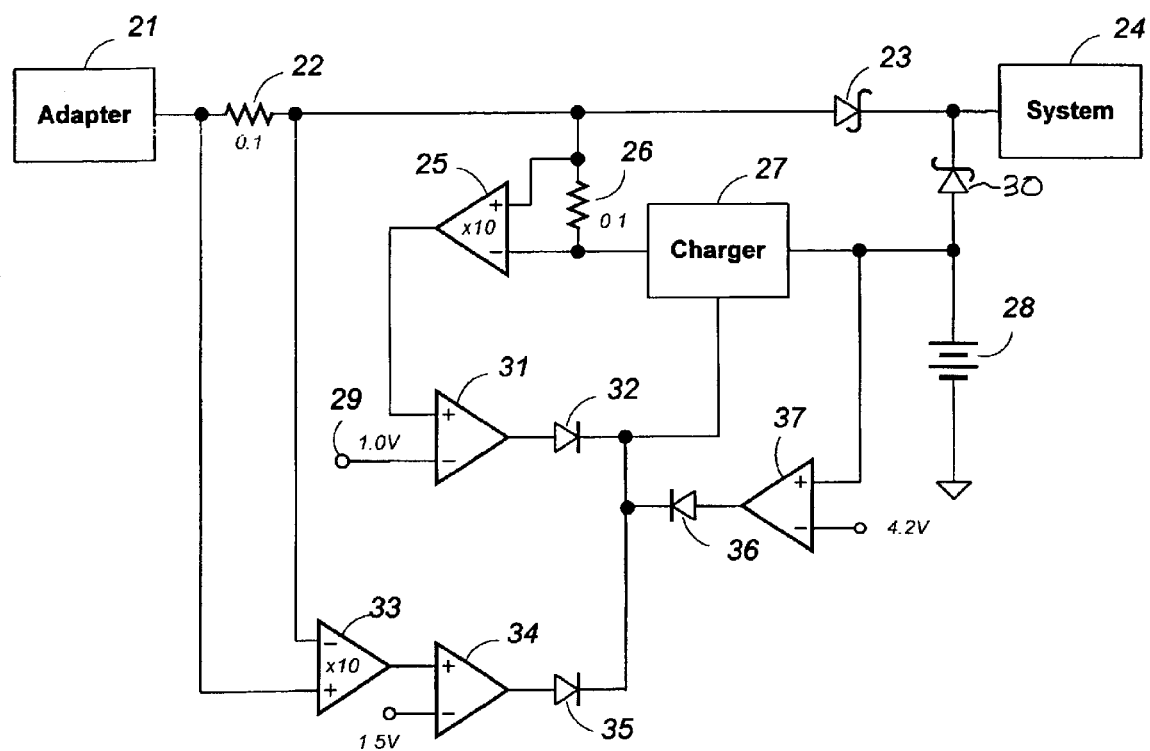
FIG. 3 shows a prior art adaptive power charging device that prioritizes the system over the charger with adapter over-current protection.
Figure 4:
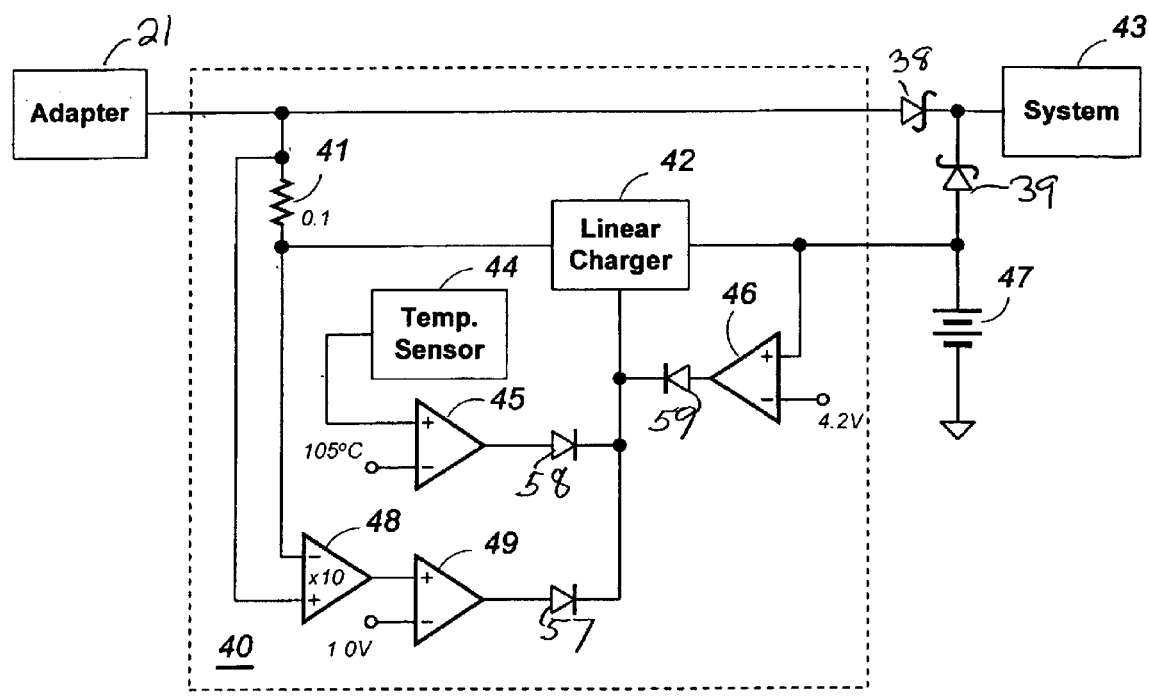
FIG. 4 shows a prior art adaptive power charging device that permits concurrent system operation and battery charging and includes over-temperature protection.

In many portable electronic devices, further integration of power management functions into an adapter-charger system is required. For example, Schottky diodes 12 and 17, shown in FIG. 1, may need to be replaced by power MOSFETs to achieve higher efficiency and reduced heat dissipation. A power MOSFET may be used for either or both of the Schottky diodes 12, 17.

Figure 5:
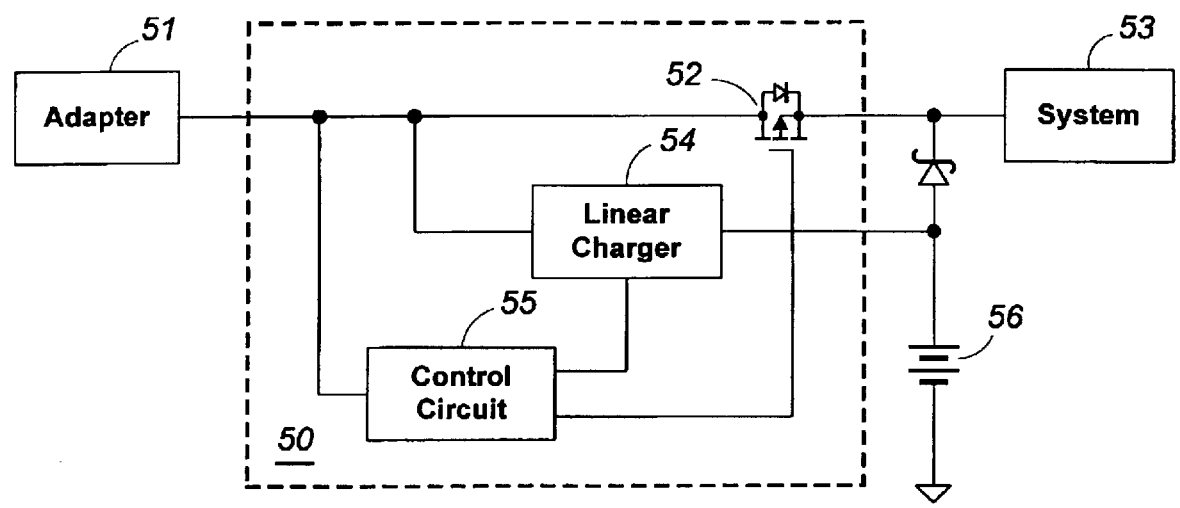
FIG. 5 shows a charging circuit with a power MOSFET that replaces the pass diodes of the prior art.

FIG. 5 shows a charging circuit with a power MOSFET that replaces a pass diode of the prior art. In FIG. 5, power MOSFET 52 replaces the pass-through Schottky diode 12 of FIG. 1. Power MOSFET 52 supplies the current required for running the system when adapter 51 is connected to a power source and to the charging system 50. Because power MOSFET 52 resides on the same substrate as linear charger 54, both contribute heat dissipation to charger system 50. In other words, the temperature rise of charger system 50 derives from two sources. Furthermore, control circuit 55 now must provide thermal limit protection to prevent linear charger 54 from drawing excessive charging current, or to prevent a main system fault condition from drawing excessive current through power MOSFET 52.

In other portable electronic devices, system design may demand that the adapter output voltage be regulated when the adapter is supplying power to the system. For example, a cellular phone circuit may specify a maximum input voltage of 4.2V, regardless of whether a Lithium Ion battery or an adapter is supplying the power to the phone (the main system 53). Since a typical adapter has a 10% tolerance on its nominal output voltage (say 5 Volts), a voltage of 5.5 Volts may be supplied by the adapter. Even with a Schottky diode, the voltage supplied to the main system would exceed the main system's specifications. Thus, the Schottky diode 12 must be replaced with a linear regulator to guarantee meeting the 4.2 Volt requirement of the main system 53. It is preferred that the linear regulator use a power MOSFET as the pass device.

Figure 6:
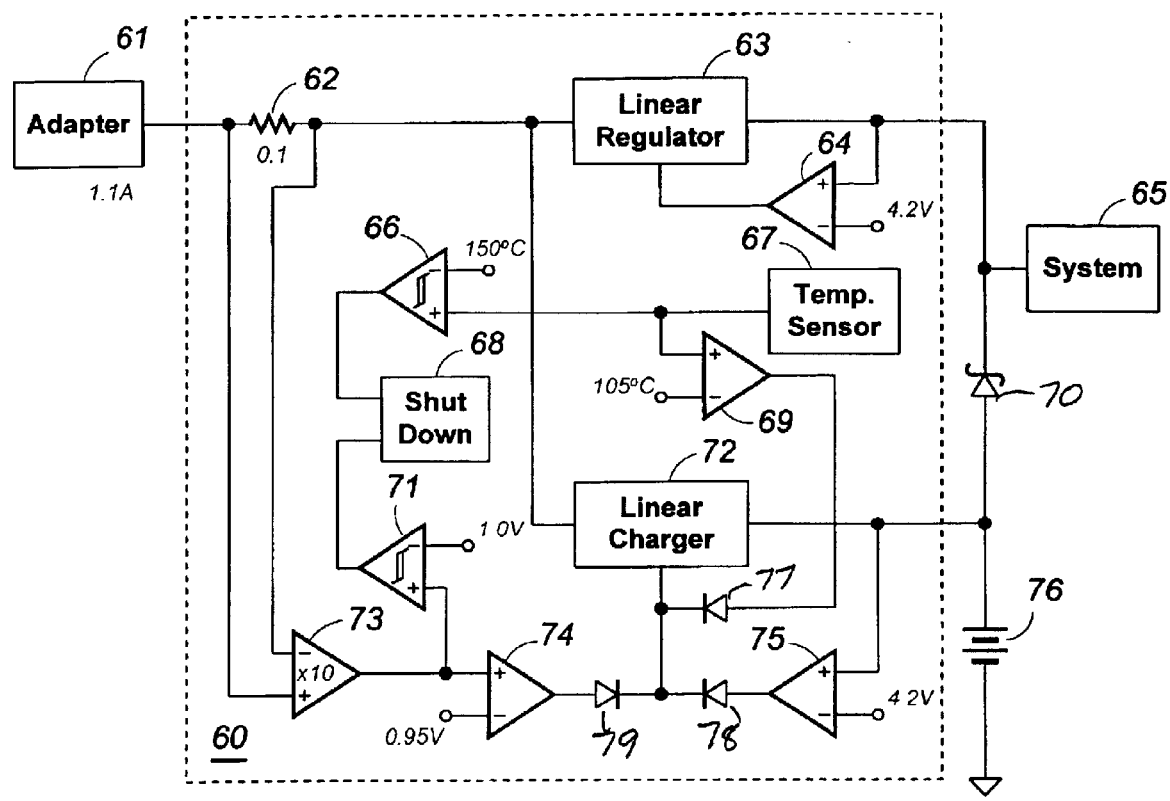
FIG. 6 shows an adaptive power charging devices that prioritizes the system over the charger with adapter current protection and over-temperature protection.

FIG. 6 shows an adaptive power charging devices that prioritizes the system over the charger and includes adapter over-current protection and system over-temperature protection. The charger system of FIG. 6 includes current sensing circuit, an adapter current control circuit, a temperature control circuit, a main system voltage control circuit, a battery voltage control circuit, a thermal shutdown circuit, a charger current control circuit, a linear charger 72, a linear regulator 63, a shutdown circuit 68 and a temperature sensor 67.

The linear charger 72 has an input connected to receive adapter current via current sensing resistor 62, an output connected to the battery 76 and a control input for controlling the charging current that passes through the linear charger to the battery.

The linear regulator 63 has an input connected to receive adapter current via the current sensing resistor 62, an output connected to the main system 65 and a control input for controlling the amount of current passing through the linear regulator 63.

The current sensing circuit includes the current sensing resistor 62, and an opamp 73 connected differentially across the current sensing resistor. In one embodiment, the current sensing resistor has a value of 0.1 ohms and the opamp 73 has a gain of 10.

The adapter current control circuit includes a comparator 71. Opamp 73 output is connected to the positive input of comparator 71, negative terminal of which is connected to a first preset voltage that determines the maximum current that is allowed to flow from the adapter. If the current sensing resistor is 0.1 ohms, the first preset voltage is 1.0 Volts and the gain of opamp is 10, then the total adapter current is limited to 1 Amp. The output of comparator 71 is connected to one input of a shutdown circuit 68. If the charger system attempts to draw more than 1.0 Amp from the adapter circuit, the charger system is shut down by shutdown circuit 68.

The temperature control circuit includes opamp 69 and isolating diode 77. The positive terminal of opamp 69 is connected to the output of the temperature sensor 67 and the negative terminal is connected to a voltage indicative of a preset temperature. The output of opamp 69 is connected to the positive side of isolating diode 77, whose negative side connects to the control input of linear charger 72. If the preset temperature is set to 105° C., then the linear charger will throttle down when the temperature of the charging system is 105° C. If the ambient temperature is permitted to be no higher than 65° C., and the thermal resistance of the system is 50° C./W, then the temperature control circuit will limit the power dissipation of the charger system to 0.8 Watts (40° C./50° C./W). If the maximum voltage provided to the battery or the main system is 4.2 Volts and the maximum voltage provided by the adapter 61 is 5.0 Volts, then the maximum adapter current permitted by the temperature control circuit is 1.0 Amps (0.8 Watts/0.8 Volts).

The charger current control circuit includes opamp 74 and isolating diode 79. The positive terminal of opamp 74 is connected to the output of opamp 73 and the negative terminal of opanp 74 is connected to a second preset voltage that determines the maximum adapter current for throttling down the charger. The output of opamp 74 is connected to the positive side of diode 79, whose negative terminal is connected to the control input of linear charger 72. If the second preset voltage is set at 0.95 Volts, then the linear charger will be throttled down when the adapter current reaches 0.95 Amps, assuming a current sensing resistor 62 value of 0.1 ohms, and a gain of 10 for opamp 73. With the second preset voltage at 0.95 Volts, the maximum charger current permitted by the charger current control circuit is 0.95 Amps.

The thermal shutdown circuit includes comparator 66. Temperature sensor 67 is connected to the positive input of comparator 66, whose negative input is connected to a voltage indicative of a preset shutdown temperature. The output of comparator 66 is connected to another input of shutdown circuit 68. If the preset shutdown temperature is set at 150° C., the charging system will shutdown when the system reaches 150° C. If the maximum permitted ambient temperature is 65° C. and the thermal resistance of the package is 50° C./W, then the maximum power permitted by the thermal shutdown circuit is 1.7 Watts (85° C./50° C./W).

The main system voltage control circuit includes opamp 64. The positive terminal of opamp 64 is connected to the voltage input for the main system 65 and the negative terminal is set at a third preset voltage. The output of the opamp 64 is connected to the control input of linear regulator 63. If the third preset voltage is set at 4.2 Volts then the main system voltage control circuit will control the linear regulator 63 to limit the main system input voltage to 4.2 Volts.

The battery voltage control circuit includes opamp 75 and isolating diode 78. The positive input of the opamp 75 is connected to the battery and the negative input is connected to a fourth preset voltage. If the fourth preset voltage is set at 4.2 Volts, then the linear charger will regulate its output voltage at 4.2 V when the battery reaches 4.2 Volts.

A Schottky diode 70 connects the battery 76 to the main system 65.

Dual-level Current Limit

Thus, as described above, the charger current control circuit is set to limit the charger current to a maximum 0.95 Amps and the adapter current control circuit is set to limit the total adapter current to 1.0 Amps. If the main system 65 requires 0.90 Amps at full load, then 0.05 Amp is available to the charger 72, because both the charger current control circuit and the adapter current control circuit use the same current sensing resistor. If the main system 65 draws only 0.01 Amps (in a power down or sleep mode), then 0.94 Amps is available to the charger, the total current from the adapter being limited to 0.95 Amps.

However, if the main system attempts to draw significantly more than 0.95 Amps (perhaps because of a fault in the main system 65), two actions are performed by the circuitry. First, the charger current control circuit shuts down the linear charger 72, when the 0.95 Amp limit is met or exceeded. This frees up some adapter current to meet the main system 65 demand. Next, if the current demand of the main system is still higher than 0.95 Amps, the adapter current control circuit will limit the adapter current to 1.0 Amps. If the current demand is equal to or higher than 1.0 Amp, the adapter control circuit will shut down the charger system 60. Charger system 60 thus enters a shutdown mode where both linear regulator 63 and linear charger 72 are turned off. This dual-level current limit scheme uses a single current-sensing resistor 62 and can correctly shut down a linear regulator or a power switch supplying power to system 65, in the event of system fault causing the overcurrent condition.

Dual-Level Temperature Limit

As described above, temperature control circuit throttles down the linear charger 72 when the temperature of the charger system reaches 105° C. and the thermal shutdown circuit shuts down the charger system 60 when the charger system reaches 150° C. Temperature sensor 67 is used by both the temperature control circuit and the thermal shut down circuit. Thus, regardless of whether the heat source is the linear regulator 63 or the linear charger 72 or both, opamp 69 regulates the charging current to maintain a constant junction temperature of 105° C. for devices in charger system 60. Table 1, set forth below, details a number of conditions, A–F, that are discussed in the text.

| System Parameter/ Condition | A | B | C | D | E | F |
|---|---|---|---|---|---|---|
| Adapter Voltage | 5.00 | 5.00 | 5.00 | 5.00 | 5.00 | 5.00 |
| Adapter Current | 0.71 | 1.63 | 0.95 | 0.95 | 0.95 | 0.80 |
| Main System Voltage | 4.20 | 4.20 | 4.20 | 4.20 | 4.20 | 4.20 |
| Main System Current | 0.10 | 0.10 | 0.10 | 0.90 | 0.25 | 0.25 |
| Battery Voltage | 3.00 | 4.20 | 4.20 | 3.00 | 3.00 | 3.00 |
| Battery Current | 0.61 | 1.53 | 0.85 | 0.05 | 0.70 | 0.55 |
| Power Dissipation - Linear Regulator | 0.08 | 0.08 | 0.08 | 0.72 | 0.20 | 0.20 |
| Power Dissipation - Linear Charger (Actual) | 1.22 | 1.22 | 0.68 | 0.10 | 1.40 | 1.10 |
| Power Dissipation - Linear Charger (Temp Limited) | 1.22 | 1.22 | 1.22 | 0.58 | 1.10 | 1.10 |
| Charger Shutdown Current | 0.95 | 0.95 | 0.95 | 0.95 | 0.95 | 0.95 |
| Maximum Adapter Current | 1.00 | 1.00 | 1.00 | 1.00 | 1.00 | 1.00 |
| Maximum package dissipation | 1.30 | 1.30 | 1.30 | 1.30 | 1.30 | 1.30 |
| Thermal Resistance | 50 | 50 | 50 | 50 | 50 | 50 |
| Ambient Temperature | 40 | 40 | 40 | 40 | 40 | 40 |
| Maximum operating temperature | 105 | 105 | 105 | 105 | 105 | 105 |

If the main system 65 is operating at an idle current of 0.1 A, the linear regulator dissipates 0.08 W when adapter voltage is at 5.0V. Assuming the ambient temperature is 40° C., opamp 69 increases the charging current to cause a power dissipation of 1.22 W. If the battery voltage is 3.0 Volts, then the temperature control circuit permits 0.61 Amps to flow through the linear charger 72. The 0.61 Amps current is lower than the 0.85 Amps permitted by the charger current control circuit under the stated conditions. This is condition A in the table.

If the battery voltage is 4.2 Volts, then the temperature control circuit permits 1.53 Amps to flow in the linear charger 72. This is condition B in the table. This current is greater than the 0.85 Amps permitted by the charger current control circuit, so the current is limited to 0.85 Amps. Thus, under the stated conditions, the charger current control circuit performs a limiting action before the temperature control circuit does. This is condition C in the table.

On the other hand, if the main system 65 draws a current of 0.9 A from a 5.0 V adapter, the linear regulator 63 dissipates 0.72 W. Because opamp 74 regulates charger current to 0.05 A under these conditions, the heat dissipated by linear charger 72 is 0.1 Watts, when battery voltage is 3.0V. At an ambient temperature of 40° C., and a thermal resistance of 50° C./W, the maximum dissipation permitted by the temperature control circuit is 1.3 Watts which is greater than the 0.82 Watts dissipated by the linear charger 72 and the linear regulator 63. Thus, under the stated conditions, no limiting action is performed by the temperature control circuit. This is condition D in the table.

When the main system draws a smaller current, a larger portion of adapter current will be available for linear charger 72. For example, if the main system draws 0.25 A, the remaining 0.70 A is available for charging the battery, as long as thermal limits are not exceeded. If the battery voltage is at 3.0V, linear charger 72 generates too much heat causing temperature control circuit to limit the power dissipation. Specifically, at 0.25 A and a 0.8 Volt drop, linear regulator 63 generates 0.2 Watts, but the linear charger generates 1.4 Watts. At ambient temperature of 40° C., the maximum overall power dissipation permitted by the temperature control circuit is 1.3 W. This is condition E in the table. Therefore, the temperature control circuit become active to reduce the charging current to 0.55 A, rather than 0.7 A that is available. This is condition F in the table. Power dissipation of the linear charger is now 1.1 Watts.

Temperature sensor also 67 provides a second level of thermal protection for the charger system 60. While comparator 71 already provides an over-current protection against system faults such as a short circuit condition, it will not protect charger system 60 from assembly defects such as a cold solder joint which can generate large amounts of heat without exceeding the current limits imposed by the adapter current control circuit or the charger current control circuit. For example, if the charger system 60 is improperly mounted to a system printed circuit board, because of a cold solder joint, the thermal resistance of the charger system 60 could be as high as 200° C./W. Even at moderate power dissipation level, 1.0 W for example, the junction temperature of charger system 60 could increase to a damaging level. Comparator 66 provides protection for charger IC 60 against such assembly defects. In the event of an abnormal thermal resistance, a safe operating power will cause an over-temperature condition. The condition will first cause the temperature control circuit to reduce the charging current to zero. If the over-heating condition persists, the thermal protection circuit will shut down the linear regulator 63 and the linear charger 72.

Although the present invention has been described in considerable detail with reference to certain preferred versions thereof, other versions are possible. Therefore, the spirit and scope of the appended claims should not be limited to the description of the preferred versions contained herein.

What is claimed is:

1. A charger system for providing power to a main system and a battery, the charger system comprising:

a current sensing circuit that includes a current sensing resistor for developing a voltage drop signal proportional to the current passing through the resistor, and an amplifier connected to the resistor for boosting the voltage drop signal across the resistor;

a linear charger connected to receive current from an external adapter via the current sensing resistor and to provide, on an output, current to the battery, the linear charger having a first control input that controls the quantity of current provided by the linear charger to the battery, a linear regulator connected to receive current from an external adapter via the current sensing resistor and to provide, on an output, current to the main system, the linear regulator having a second control input that controls the quantity of current provided by the linear regulator to the main system;

a shutdown circuit for preventing the operation of the linear regulator and the linear charger upon receipt of a first or second shutdown input;

a first current control circuit connected to the amplifier output of the current sensing circuit, the first current control circuit having an output connected to the first shutdown input and an input for receiving a first preset voltage that determines a signal value on the first shutdown input;

a second current control circuit connected to the amplifier output of the current sensing circuit, the second current control circuit having an output connected to the first control input and an input for connecting to a second preset voltage that determines a signal value on the first control input;

a temperature sensor for sensing the operating temperature of at least the linear regulator and the linear charger and providing an output indicative of the sensed temperature;

a first temperature control circuit having an input connected to receive the temperature sensor output and an input for receiving a voltage indicative of a first preset temperature, the first temperature control circuit having an output connected to the first control input to control the current passing through the linear charger, and the first temperature control circuit throttling down the linear charger when the sensed temperature exceeds the first preset temperature;

a second temperature control circuit having an input connected to receive the temperature sensor output and an input for receiving a voltage indicative of a second preset temperature, the second temperature control circuit having an output connected to the second shutdown input to shut down the linear regulator and linear charger when the sensed temperature equals or exceeds the second preset temperature, a first voltage control circuit having a first input connected to the output of the linear regulator and second input for connecting to a third preset voltage, the first voltage control circuit having an output connected to the control input of the linear regulator to regulate the voltage provided to the main system; and a second voltage control circuit having a first input connected to the output of the linear charger and a second input for connecting to a fourth preset voltage, the second voltage control circuit having an output connected to the control input of the linear charger to regulate the voltage provided to the battery.

2. A charger system for providing power to a main system and a battery, the charger system comprising:

means for sensing current provided by an external adapter;

means for sensing temperature of charger system;

main system regulator means for providing a current and voltage to the main system and for regulating said main system current and voltage;

battery charger means for providing a current and voltage to the battery and for regulating said battery current and voltage;

means, connected to the battery charger means, for limiting the maximum current provided by the battery charger means in response to the sensing current means;

means, connected to the battery charger means, for limiting the maximum current provided by the battery charger means in response to temperature sensing means;

throttling means for throttling down the charger system in response to either the sensing current means or the sensing temperature means;

means, connected to the throttling means, for limiting the maximum current provided by the external adapter in response to the sensing current means;

means, connected to the main system regulator means, for controlling the voltage provided by the main system regulator means; and means, connected to the battery charger means, for controlling the voltage provided by the battery charger means.

3. A charger system for providing power to a main system and a battery, the charger system comprising:

a current sensing resistor for developing a voltage drop based on the current supplied from an external adapter;

a linear regulator having an input connected to receive current from the external adapter via the current sensing resistor, an output for supplying current to the main system, and a control input for controlling the amount of current supplied by the output to the main system;

a linear charger having an input connected to receive current from the external adapter via the current sensing resistor, an output for supplying current to the battery, an a control input for controlling the amount of current supplied by the output to the battery;

a shut down circuit having a pair of inputs, a signal on either input instructing the shut down circuit to at least shut down the linear regulator and the linear charger;

three diodes each having a negative terminal connected to the control input of the linear charger;

a temperature sensor for sensing an operating temperature of at least the linear regulator and linear charger, and for providing on an output a voltage indicative of sensed operating temperature;

a first amplifier connected differentially to the current sensing resistor, the first amplifier having an output for carrying an amplified voltage drop across the current sensing resistor;

a first comparator having a first input connected to the output of the first amplifier and a second input connected to a first preset voltage, the first comparator having an output connected to one of the inputs of the shut down circuit;

a second amplifier having a first input connected to the output of the first amplifier and a second input connected to a second preset voltage, the second amplifier having an output connected to a positive terminal of a first one of the three diodes;

a third amplifier having a first input connected to the output of the linear regulator and a second input connected to a third preset voltage, the third amplifier having an output connected to the control input of the linear regulator;

a fourth amplifier having a first input connected to the output of the linear charger and a second input connected to a fourth preset voltage, the fourth amplifier having an output connected to a positive terminal of a second one of the three diodes;

a fifth amplifier having a first input connected to the output of the temperature sensor and a second input connected to a voltage indicative of a first preset temperature, the fifth amplifier having an output connected to a positive terminal of a third one of the three diodes;

a second comparator having a first input connected to the output of the temperature sensor and a second input connected to a voltage indicative of a second preset temperature, the second comparator having an output connected to the other input of the shutdown circuit.

4. A charger system as recited in claim 3, wherein the current sensing resistor, the linear regulator, the linear charger, the shutdown circuit, the three diodes, the temperature sensor, the first through fifth amplifiers and the first and second comparators all reside on a common substrate; and wherein the temperature sensor senses the temperature of the common substrate.

5. A charger system as recited in claim 3, wherein the first preset voltage is greater than the second preset voltage.

6. A charger system as recited in claim 5, wherein the first preset voltage is 1.0 Volt.

7. A charger system as recited in claim 5, wherein the second preset voltage is 0.95 Volt.

8. A charger system as recited in claim 3, wherein the third preset voltage is equal to the fourth preset voltage.

9. A charger system as recited in claim 8, wherein the fourth preset voltage is 4.2 Volts.

10. A charger system as recited in claim 8, wherein the fourth preset voltage is approximately the voltage of the battery when fully charged.

11. A charger system as recited in claim 3, wherein the second preset temperature is greater than the first preset temperature.

12. A charger system as recited in claim 11, wherein the first preset temperature is approximately 105 degrees C.

13. A charger system as recited in claim 11, wherein the first preset temperature is the maximum operating temperature of the linear regulator.

14. A charger system as recited in claim 11, wherein the first preset temperature is the maximum operating temperature of the linear charger.

15. A charger system as recited in claim 11, wherein the second preset temperature is approximately 150 degrees C.

* * * * *